(12) United States Patent
Oh et al.

(10) Patent No.: US 9,900,370 B2
(45) Date of Patent: Feb. 20, 2018

(54) APPARATUS AND METHOD FOR CONTROLLING EXECUTION OF MASHUP WEB OF THINGS SERVICE

(71) Applicant: ELECTRONICS AND TELECOMMUNICATIONS RESEARCH INSTITUTE, Daejeon (KR)

(72) Inventors: Se-Won Oh, Daejeon (KR); Sang-Gi Hong, Daejeon (KR); Young-Bag Moon, Seoul (KR); Mal-Hee Kim, Daejeon (KR); Min-Kyo In, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 253 days.

(21) Appl. No.: 14/722,043

(22) Filed: May 26, 2015

(65) Prior Publication Data

US 2015/0365461 A1    Dec. 17, 2015

(30) Foreign Application Priority Data

Jun. 16, 2014  (KR) .................. 10-2014-0073128
Nov. 14, 2014  (KR) .................. 10-2014-0158473

(51) Int. Cl.
*G06F 15/16* (2006.01)
*H04L 29/08* (2006.01)
*G06F 17/30* (2006.01)

(52) U.S. Cl.
CPC ........ *H04L 67/02* (2013.01); *G06F 17/30864* (2013.01); *H04L 67/12* (2013.01); *H04L 67/2809* (2013.01); *H04L 67/32* (2013.01)

(58) Field of Classification Search
CPC .... H04L 67/02; H04L 67/32; G06F 17/30864
USPC .................................................. 709/201, 200
See application file for complete search history.

(56) References Cited

U.S. PATENT DOCUMENTS

| 2012/0059926 | A1 | 3/2012 | Jung et al. |
| 2014/0089825 | A1 | 3/2014 | Lee et al. |
| 2014/0149561 | A1 | 5/2014 | Bae et al. |
| 2015/0081798 | A1* | 3/2015 | Lee ..................... H04L 67/2809 709/205 |

FOREIGN PATENT DOCUMENTS

KR    10-2010-0120905 A    11/2010

* cited by examiner

*Primary Examiner* — El Hadji Sall

(57) ABSTRACT

An apparatus and method for controlling the execution of mashup WoT service are disclosed herein. The apparatus includes a WoT mashup service functionality entity, a WoT service execution functional entity, and a WoT service repository. The WoT mashup service functionality entity makes a response to a mashup WoT service request from a WoT service user by executing a mashup WoT service optimized for the WoT service user. The WoT service execution functional entity returns the results of simple WoT services to the WoT mashup service functionality entity in response to a request for the execution of the simple WoT services for the execution of the mashup WoT service from the WoT mashup service functionality entity. The WoT service repository stores WoT service execution descriptions each descriptive of execution logic for each of the simple WoT services.

6 Claims, 7 Drawing Sheets

APPARATUS AND METHOD FOR CONTROLLING EXECUTION OF MASHUP WEB OF THINGS SERVICE

CROSS-REFERENCE TO RELATED APPLICATIONS

This application claims the benefit of Korean Patent Application Nos. 10-2014-0073128 and 10-2014-0158473, filed Jun. 16, 2014 and Nov. 14, 2014, respectively, which are hereby incorporated by reference herein in their entirety.

BACKGROUND

1. Technical Field

Embodiments of the present invention relate to an apparatus and method for controlling the execution of mashup World Wide Web (Web) of things (WoT) service and, more particularly, to an apparatus and method that are capable of inquiring about, registering and executing a new service in which two or more WoT services are combined when executing available WoT service in a Web application service environment.

2. Description of the Related Art

With the expansion of the Internet of Things (IoT) and the wearable device market, the interest in IoT-related services and applications has gradually increased.

In particular, the IoT can provide a user with useful information services (for example, temperature, humidity, heart rate, location coordinate, distance information, etc.) or enables the remote control of things (for example, brightness and indoor temperature control, etc.) through the exchange of information between things each equipped with a communication function.

Service in which things provide service to a user while communicating with the user using conventional Web technology in an IoT environment is called Web-based IoT service or WoT service. In this case, to receive intelligent service from things, service mashup that generates a new service by combining basic WoT services provided by things and then executes a WoT service appropriate for the demand of a user is essential.

Conventional mashup (or Web mash-up) refers to developing a new Web service by combining various pieces of information and Web service APIs disclosed over the Web. For example, in the case of service mashup that inquires about outdoor temperature at a current location, it is possible to combine the current location information of a user with a Web-based temperature inquiry service provided by a meteorological observatory and then provide a target service to the user.

However, when a problem with a specific Web service API constituting a single mashup service occurs, the overall mashup service cannot be appropriately executed. In other words, in the forgoing mashup example, when a problem with a temperature inquiry service API that is provided to the meteorological observatory occurs, the overall mashup service cannot be executed.

Furthermore, there are cases where the conventional service mashup uses fragmentary user information, such as the location of a user, the time at which the user makes a request, etc., to call a Web service API. However, in this case, a service mashup method that takes into account the state of the provision of a Web service API, QoS, and a user's preference and personal features (age, gender, area, school, vocation, etc.) is not provided.

As a related technology, Korean Patent Application Publication No. 2010-0120905 discloses a technology in which a user can freely search and select ontology, can automatically combine semantic services based on the results of the searching and the selection, and can provide an interface via which a combined composite semantic service or a semantic workflow and the user interact with each other.

SUMMARY

At least some embodiments of the present invention are directed to the provision of an apparatus and method for controlling the execution of mashup WoT service, which, in connection with the control of the service execution of a WoT service system, can generate a mashup WoT service appropriate for a WoT service user by combining various WoT services provided by things, and can execute and inquire about the mashup WoT service.

In accordance with an aspect of the present invention, there is provided an apparatus for controlling execution of mashup WoT service, including: a WoT mashup service functionality entity configured to make a response to a mashup WoT service request from a WoT service user by executing a mashup WoT service optimized for the WoT service user; a WoT service execution functional entity configured to return the results of simple WoT services to the WoT mashup service functionality entity in response to a request for the execution of the simple WoT services for the execution of the mashup WoT service from the WoT mashup service functionality entity; and a WoT service repository configured to store WoT service execution descriptions each descriptive of execution logic for each of the simple WoT services.

The WoT mashup service functionality entity may include a WoT mashup engine configured to read the WoT service execution description from the WoT service repository, or to execute the mashup WoT service in accordance with a service rule in the corresponding WoT service execution description; and a WoT mashup logic management configured to inquire of the WoT service repository about the WoT service execution description or to register or to update the WoT service execution description.

The WoT mashup engine may operate in conjunction with the WoT service execution functional entity.

The WoT service execution functional entity may operate in conjunction with a WoT broker or a general Web service in order to execute each of the simple WoT services.

Each of the WoT service execution descriptions may stipulate a method of executing the simple WoT service or a method of executing the mashup WoT service in which two or more simple WoT services are combined.

Each of the WoT service execution descriptions may include information about the execution of the mashup WoT service, a service rule adapted to execute the mashup WoT service generated by combining the two or more simple WoT services, and service profiles representative of parameters adapted to identify the mashup WoT service optimized for the WoT service user.

The service rule may correspond to any one of sequential execution, arithmetic operation execution, logic operation execution, and conditional execution.

In accordance with another aspect of the present invention, there is provided a method of controlling execution of a mashup WoT service, including: receiving, by a WoT mashup service functionality entity, a mashup WoT service request from a WoT service user; selecting, by the WoT mashup service functionality entity, a mashup WoT service optimized for the WoT service user based on a WoT service repository that stores WoT service execution descriptions each descriptive of execution logic for a simple WoT service; and executing, by the WoT mashup service functionality entity, the optimized mashup WoT service in conjunction with a WoT service execution functional entity that is able to execute the simple WoT service.

Selecting the mashup WoT service optimized for the WoT service user may include selecting and combining two or more WoT service execution descriptions that belong to the WoT service execution descriptions stored in the WoT service repository and that are optimum for the WoT service user.

The mashup WoT service may be generated by combining the simple WoT services that are two or more in number; and executing the optimized mashup WoT service may include requesting the WoT service execution functional entity to execute the simple WoT services, receiving results of execution of the simple WoT service, and executing the optimized mashup WoT service based on the results of the execution of the simple WoT services.

Each of the WoT service execution descriptions may include a service rule, and the service rule may correspond to any one of sequential execution, arithmetic operation execution, logic operation execution, and conditional execution.

The sequential execution may be presented in the form of "mashup WoT service #C =simple WoT service #B (simple WoT service #A)"; and the sequential execution may be performed to calculate a result of the mashup WoT service #C by using a result of execution of the simple WoT service #A as an input of the simple WoT service #B.

The arithmetic operation execution may be presented in the form of "mashup WoT service #C=α·simple WoT service #A+β·simple WoT service #B"; and the arithmetic operation execution may be performed to calculate a result of the mashup WoT service #C based on the operation results of execution of the simple WoT services #A and #B, and α and β may be the parameters of the service execution profiles.

The logic operation execution may be presented in the form of "mashup WoT service #C=simple WoT service #A & simple WoT service #B"; and the logic operation execution may be performed to calculate a result of the mashup WoT service #C based on the operation results of execution of the simple WoT services #A and #B, and the logic operation operator "&" may refer to a case where the results of the simple WoT services #A and #B meet a specific condition.

The logic operation execution may be presented in the form of "mashup WoT service #C=simple WoT service #A|simple WoT service #B"; and the logic operation execution may be performed to calculate the result of the mashup WoT service #C based on operation results of execution of the simple WoT services #A and #B, and the logic operation operator "|" may refer to a case where at least one of the results of the simple WoT services #A and #B meets a specific condition.

The conditional execution may be presented in the form of "simple WoT service #A ? simple WoT service #B:simple WoT service #C"; and the conditional execution may be performed to execute the simple WoT service #B if the simple WoT service #A meets a specific condition and execute the simple WoT service #C if the simple WoT service #A does not meet the specific condition.

The method may further include inquiring, by the WoT mashup service functionality entity, of the WoT service repository about the WoT service execution description, or registering or updating, by the WoT mashup service functionality entity, the WoT service execution description.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
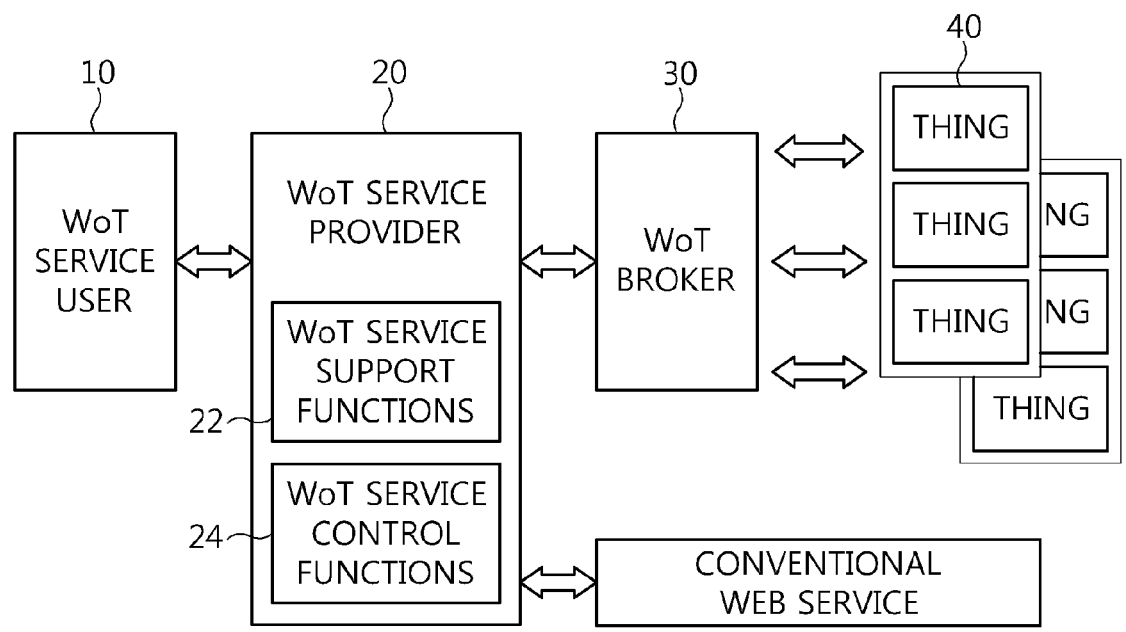
FIG. 1 is a diagram illustrating the configuration of a WoT service system to which the present invention is applied.

The present invention may be subjected to various modifications and have various embodiments. Specific embodiments are illustrated in the drawings and described in detail below.

However, it should be understood that the present invention is not intended to be limited to these specific embodiments but is intended to encompass all modifications, equivalents and substitutions that fall within the technical spirit and scope of the present invention.

The terms used herein are used merely to describe embodiments, and not to limit the inventive concept. A singular form may include a plural form, unless otherwise defined. The terms, including "comprise," "includes," "comprising," "including" and their derivatives specify the presence of described shapes, numbers, steps, operations, elements, parts, and/or groups thereof, and do not exclude presence or addition of at least one other shapes, numbers, steps, operations, elements, parts, and/or groups thereof.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Embodiments of the present invention are described in greater detail below with reference to the accompanying drawings. In order to facilitate the general understanding of the present invention, like reference numerals are assigned to like components throughout the drawings and redundant descriptions of the like components are omitted.

FIG. 1 is a diagram illustrating the configuration of a WoT service system to which the present invention is applied.

The WoT service system includes a WoT service provider 20, and a WoT broker 30.

The WoT service provider 20 may provide various Web services related to things 40, i.e., WoT service, to a WoT service user 10.

Accordingly, the WoT service provider 20 performs information management and service execution control functions related to WoT service. That is, the WoT service provider 20 may include a module 22 responsible for the function of managing information about WoT service, and a module 24 responsible for the function of controlling the execution of WoT service.

Furthermore, the WoT service provider 20 allows things to operate in conjunction with each other via the Web in order to execute a simple WoT service.

The WoT broker 30 is responsible for an access load attributable to the conjunctive operation of a large number of things. Furthermore, the WoT broker 30 provides the function of managing WoT resources. Accordingly, the WoT broker 30 is viewed as a broker system that supports the conjunctive operation of the things 40 via the Web.

Figure 2:
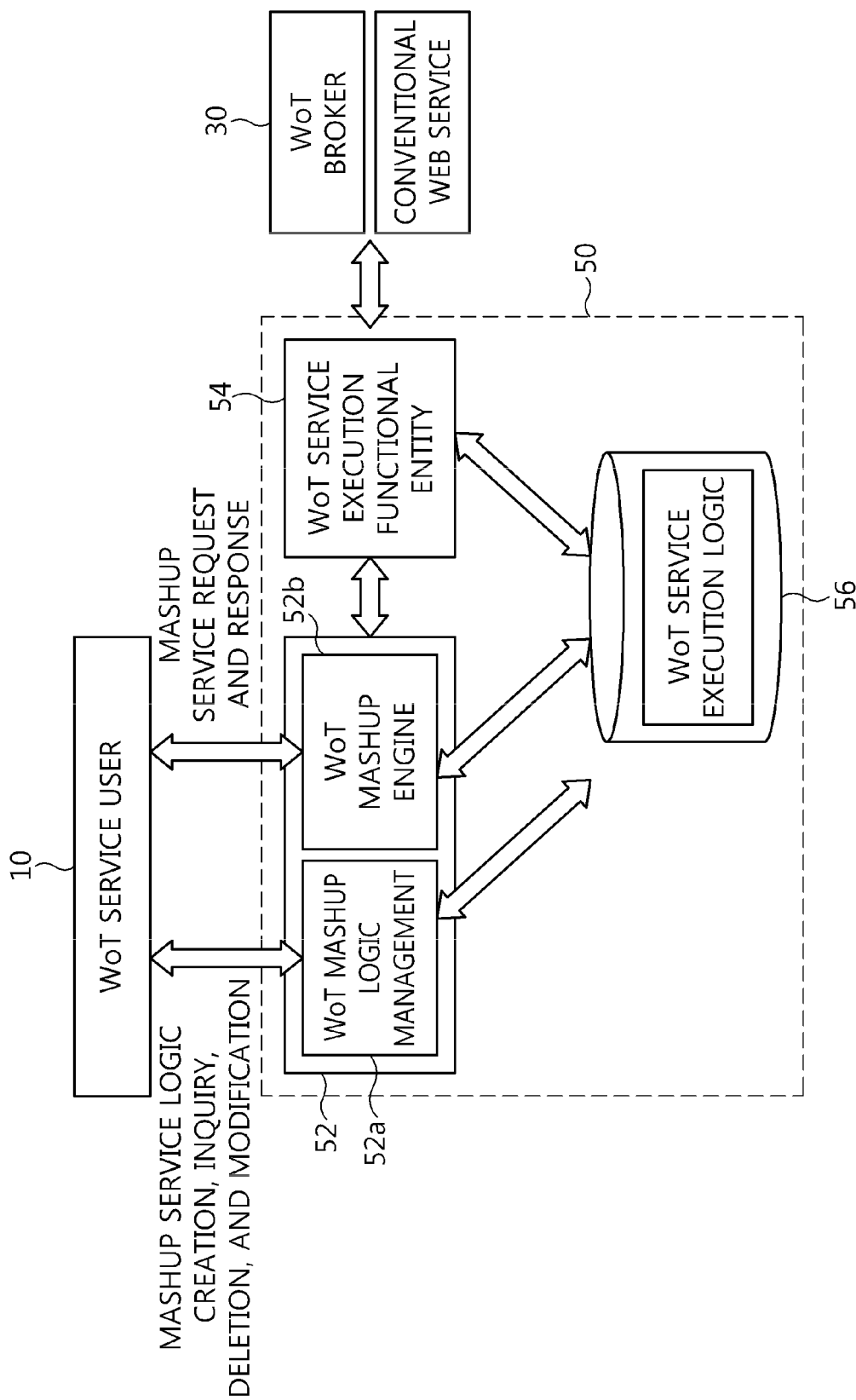
FIG. 2 is a diagram illustrating the configuration of an apparatus for controlling the execution of mashup WoT service according to an embodiment of the present invention.

FIG. 2 is a diagram illustrating the configuration of an apparatus 50 for controlling the execution of mashup WoT service according to an embodiment of the present invention.

The apparatus 50 for controlling the execution of mashup WoT service illustrated in FIG. 2 includes a WoT mashup service functionality entity 52, a WoT service execution functional entity 54, and a WoT service repository 56.

The WoT mashup service functionality entity 52 may make a corresponding response to a mashup WoT service request from the WoT service user 10. Furthermore, the WoT mashup service functionality entity 52 may perform a corresponding operation in response to a request for the creation, deletion or modification of mashup WoT service logic or an inquiry about mashup WoT service logic from the WoT service user 10.

In this case, WoT mashup service functionality entity 52 includes a WoT mashup logic management 52a, and a WoT mashup engine 52b.

The WoT mashup logic management 52a includes the function of inquiring of the WoT service repository 56 about a WoT service execution description or registering or updating a WoT service execution description.

The WoT mashup engine 52b reads a WoT service execution description from the WoT service repository 56, or executes mashup WoT service in accordance with a service rule. That is, when the WoT service user 10 requests a specific mashup WoT service (for example, a discomfort index-based cooling service), the WoT mashup engine 52b inquires of the WoT service repository 56 about a WoT service execution description capable of providing a mashup WoT service optimum for the corresponding user. Thereafter, the WoT mashup engine 52b executes mashup WoT service in accordance with a service rule included in the retrieved WoT service execution description. In this case, the WoT mashup engine 52b may operate in conjunction with the WoT service execution functional entity 54.

The WoT service execution functional entity 54 performs the function of, when receiving a request for the execution of a simple WoT service from the WoT mashup service functionality entity 52, performing the corresponding WoT service and returning the result of the performance to the thing mashup execution unit 52b. In this case, the WoT service execution functional entity 54 may operate in conjunction with the WoT broker 30 or a conventional Web service in order to execute the simple WoT service.

The WoT service repository 56 stores information related to the execution of WoT service.

Figure 3:
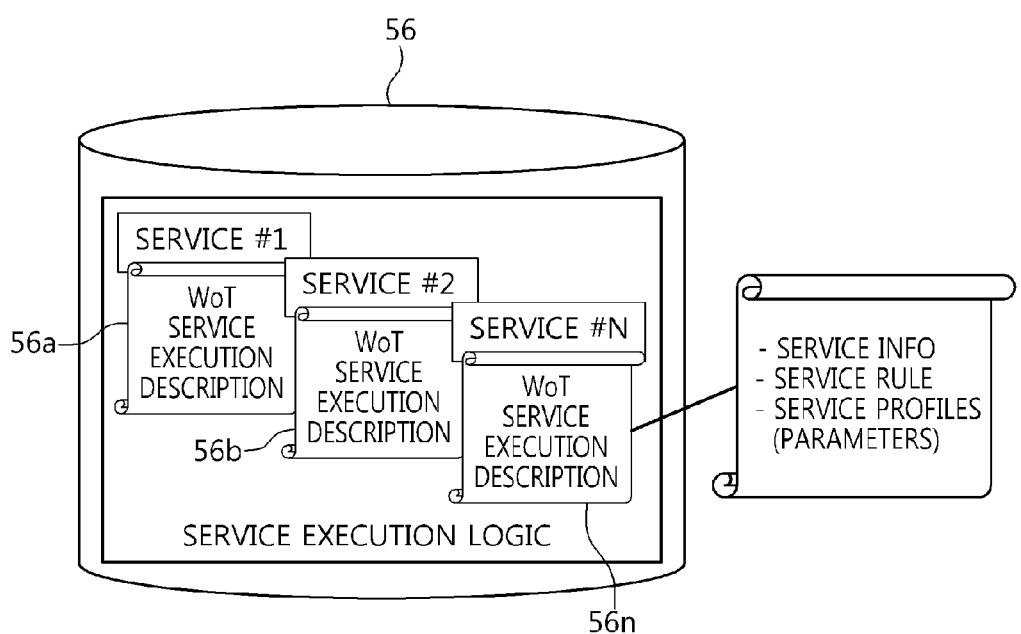
FIG. 3 is a diagram illustrating the internal configuration of the WoT service repository illustrated in FIG. 2.

FIG. 3 is a diagram illustrating the internal configuration of the WoT service repository 56 illustrated in FIG. 2.

The WoT service repository 56 stores WoT service execution descriptions 56a, 56b and 56n describing a plurality of pieces of execution logic for respective WoT services. That is, a plurality of WoT service execution descriptions is stored in the WoT service repository 56.

Each of the WoT service execution descriptions 56a, 56b and 56n describes a method of executing a simple WoT service or a mashup/compound WoT service in which two or more simple WoT services are combined.

Each of the WoT service execution descriptions 56a, 56b and 56n includes mashup WoT service information (for example, an agent who provides a mashup WoT service, an access method, and QoS), a service rule adapted to execute a mashup WoT service generated by combining two or more WoT services, and service profiles descriptive of parameters adapted to identify the mashup WoT service optimized for a user, such as a user preference and an execution request situation (a point in time, location) for the mashup WoT service, etc. As well, service profiles may accommodate a static information for a specific WoT service, such as version of service, service life cycle, and service classification, etc.

In this case, the mashup WoT service information included in each of the WoT service execution descriptions 56a, 56b and 56n may include information about a description of the mashup WoT service, including the uniform resource indicator (URI) of an agent who provides the mashup WoT service or a Web service application programming interface (API).

Furthermore, each of the WoT service execution descriptions 56a, 56b and 56n may include the execution rule of a mashup WoT service in which two or more simple WoT services are combined. Accordingly, for example, when existing simple WoT services #A and #B are present, the execution rule of mashup WoT service #C may be represented using sequential execution, arithmetic operation execution, logic operation execution, or conditional execution, as follows:

1) Sequential Execution: #C=#B (#A)
; #A is first executed, and then #B is executed using the result of #A as the input of #B.

2) Arithmetic Operation Execution: #C=$\alpha$·#A+$\beta$·#B
; #C is determined based on the results of operation obtained by executing respective simple WoT services #A and #B. In this case, $\alpha$ and $\beta$ are indicative of additional information that can be combined with the results of the execution of the simple WoT services #A and #B. $\alpha$ and $\beta$ may be defined using the parameters of service profiles.

3) Logic Operation Execution: #C=#A & #B (or #C=#A|#B)
; #C is determined based on the results of operation obtained by executing respective simple WoT services #A and #B. In this case, the logic operation operator "&" refers to the case where two service results meet a specific condition. The logic operation operator "|" refers to the case where at least one of two service results meets a specific condition.

4) Conditional Execution: #A ? #B:#C
; If simple WoT service #A meets a specific condition, simple WoT service #B is executed. Otherwise simple WoT service #C is executed. Here, the condition about

A may be specified using any of equality and relational operators, such as "greater-than", "less-than", "equal-to".

In this case, the conditional execution represents a rule so that a subsequent simple WoT service varies depending on the result of the execution of a preceding simple WoT service.

An example is given, as follows. To calculate thermal comfort index, it is necessary to combine numerical values related to various indices, such as temperature, humidity, air current speed, radiant temperature, water vapor partial pressure, etc. In particular, discomfort index, i.e., representative thermal comfort index, may be calculated using temperature T (measured in units of ° C.) and relative humidity RH (measured in units of %) via the following equation:

$$\text{Discomfort index} = (9/5)T - 0.55(1-RH)((9/5)T-26)+32$$

To execute a discomfort index mashup service, first, simple WoT service #A related to the measurement of current temperature T and simple WoT service #B related to relative humidity RH are performed separately. Thereafter, the result of a discomfort index mashup operation may be obtained using the above equation. That is, the execution rule of discomfort index mashup service #C may be represented by the operation execution of simple WoT services #A and #B.

Meanwhile, the service profiles included in each of the WoT service execution descriptions 56a, 56b and 56n may include parameters adapted to provide a WoT service appropriate for a user by taking into account the situation (location, point in time, expense, preference, and/or selection condition) of a user who requests the execution of each simple WoT service and the state (accessibility, driving state, QoS) of a thing which provides the simple WoT service.

Figure 4:
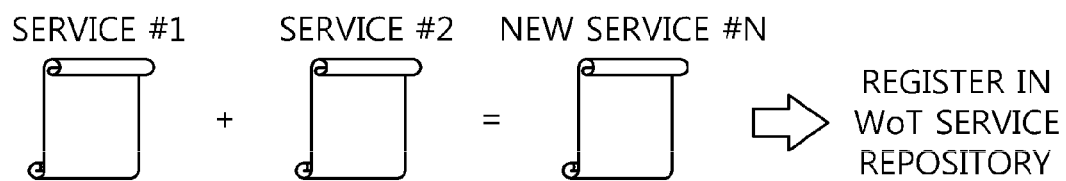
FIG. 4 illustrates an example in which a service rule has been applied to a mashup WoT service in an embodiment of the present invention.

FIG. 4 illustrates an example in which a service rule has been applied to a mashup WoT service in an embodiment of the present invention. That is, FIG. 4 illustrates the case where new mashup WoT service #n is generated using two existing simple WoT services #1 and #2 present in the WoT service repository 56.

In FIG. 4, new mashup WoT service n that executes the arithmetic operation of two simple WoT services is another service. The new mashup WoT service n is stored (registered) in the WoT service repository 56.

Furthermore, when a user makes an execution request, the new mashup WoT service n is executed via the WoT mashup engine 52b of the mashup WoT service functionality entity 52. The WoT mashup engine 52b provides the result of the execution to the user as a service response.

Figure 5:
FIG. 5 illustrates an example in which service profiles have been applied to a mashup WoT service in an embodiment of the present invention.

FIG. 5 illustrates an example in which service profiles have been applied to a mashup WoT service in an embodiment of the present invention. That is, FIG. 5 illustrates a method of applying service profiles included in a WoT service execution description to a mashup WoT service.

A user who desires to receive the new mashup WoT service n may apply profiles (that is, parameters α and β) specialized for the user who requests the service to the respective simple WoT services with respect to the results of the execution of the simple WoT services #1 and #2.

By doing so, the new mashup WoT service n can be received.

As described above, a service example of providing a discomfort index-based cooling mashup service by applying an embodiment of the present invention is as follows:

1) User A (i.e., a WoT service user) inquires about a discomfort index-based cooling service via the apparatus 50 for controlling the execution of mashup WoT service and then requests the execution of the corresponding mashup WoT service in order to receive the service in a room.

2) Accordingly, the WoT mashup engine 52b within the apparatus 50 for controlling the execution of mashup WoT service inquires about a corresponding mashup WoT service execution description stored in the WoT service repository 56. Thereafter, the WoT mashup engine 52b measures indoor temperature and relative humidity by allowing simple WoT services to be separately executed via the WoT service execution functional entity 54.

3) Thereafter, the WoT mashup engine 52b calculates discomfort index based on an operation execution rule while taking into account the service profiles of the WoT service execution description. Since discomfort indices felt by individuals are different from each other, the WoT mashup engine 52b may calculate discomfort indices specialized for each user using parameter information stored in profiles, such as gender, age, temperature precision, cooling sensitivity, etc.

4) Thereafter, the WoT mashup engine 52b executes a WoT service related to an available cooling device in order to provide comfort desired by the corresponding user using the calculated discomfort index. In other words, the WoT mashup engine 52b executes a WoT service related to things (for example, an air conditioner, a ventilation fan, etc.) in order to reduce the discomfort index if the calculated discomfort index exceeds a specific numerical value designated in a WoT service execution description.

The service rule and service profiles of a mashup WoT service for the above-described example of a discomfort index-based cooling mashup service may be described, as in Table 1 below:

TABLE 1

- Service Info:
    ID = #N;
    Service Category = cooling service;
    WoT Service Provider = iCooler Inc.;
    WoT Service Type = mashup
    Quality of WoT Service = good
- Service Rule:
    (x = #A);
    (y = #B);
    (z = #M) = (1.8x + 0.55(1−y)(1.8x−25)+35p);
    #N = (z>80? #C: (z>75? #D & #E : #F));
- Service Profiles:
    location =\*\*\*, \*\*-ro, \*\*-gu, Daejeon City
    p=0.9

In this case, the above-described mashup WoT cooling service #N may be viewed as a service in which the following simple WoT services have been combined.

Simple Service #A: temperature detection
Simple Service #B: humidity detection
Simple Service #C: air conditioner operation
Simple Service #D: air conditioner stopping
Simple Service #E: ventilation fan operation
Simple Service #F: ventilation fan stopping
Mashup Service #M: discomfort index calculation service Furthermore, in the calculation of the discomfort index, the calculation of the numerical value of the discomfort index of the corresponding user may be compensated for using parameter p.

Moreover, in the execution of simple WoT services constituting the mashup WoT service, the execution request location of the user or a parameter adapted to set the blowing strength of the cooling device may be taken into account using service profiles.

That is, when a service execution description of a single mashup WoT service is executed, the same service rule may provide a different result in response to a request from a user by taking into account service profiles appropriate for the request situation of the user. For example, when the execution rule of mashup WoT service #C is defined as "#C=α·#A+β·#B," a user who uses the corresponding mashup WoT service may allow a WoT service appropriate for his or her own request situation to be executed using the parameters α and β of corresponding execution profiles.

Figure 6:
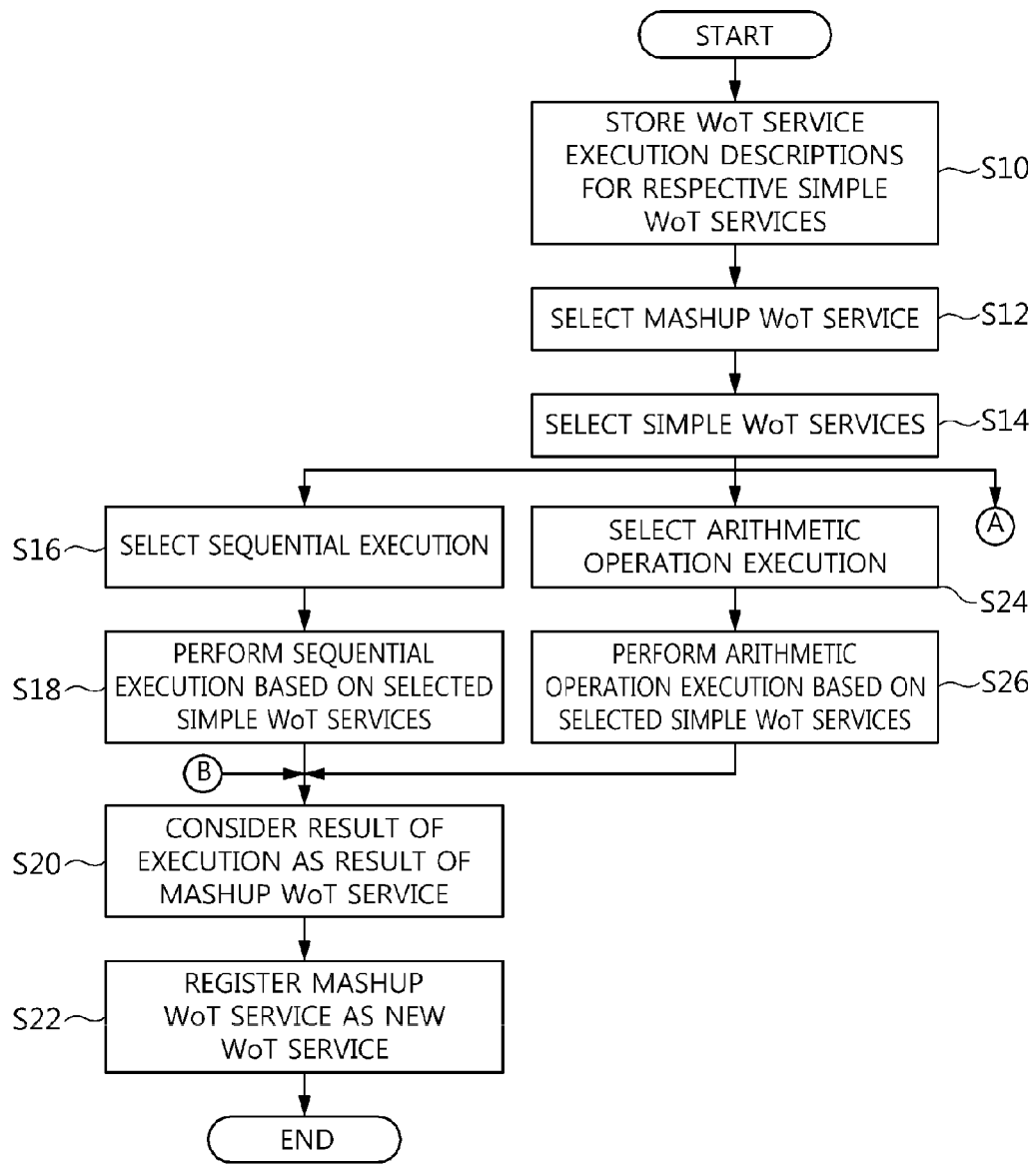
FIGS. 6 and 7 are flowcharts illustrating a method of controlling the execution of a mashup WoT service according to an embodiment of the present invention.
Figure 7:
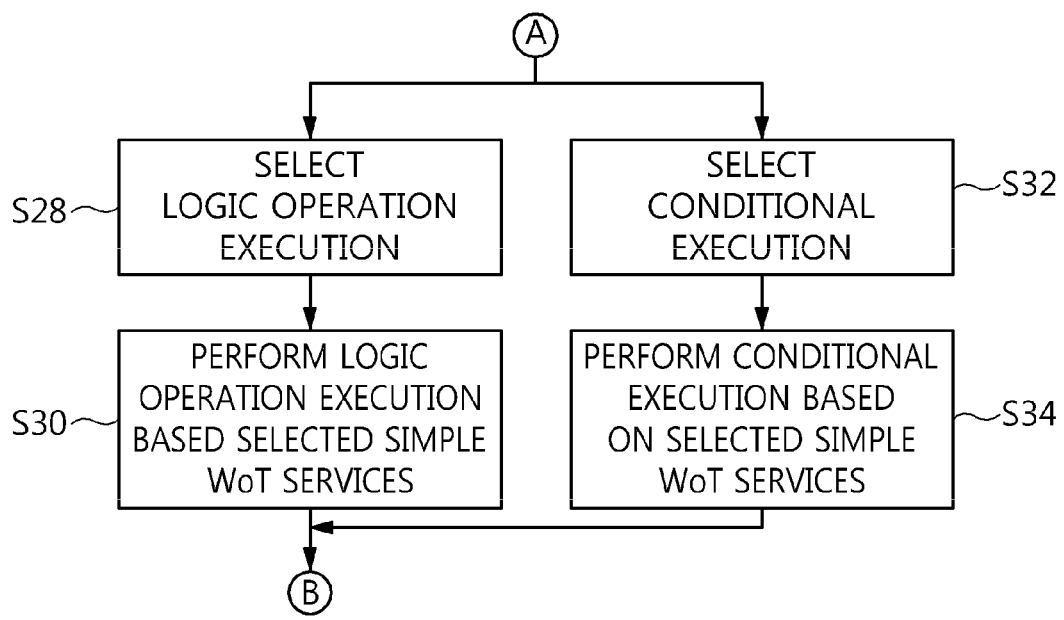

FIGS. 6 and 7 are flowcharts illustrating a method of controlling the execution of a mashup WoT service according to an embodiment of the present invention.

First, an execution description of a simple WoT service (that is, a WoT service execution description) is stored in the WoT service repository 56 at step S10. In this case, the WoT service execution description stipulates a method of executing a simple WoT service or a mashup WoT service in which two or more simple WoT services are combined.

Thereafter, a user who desires to receive a mashup WoT service, that is, the WoT service user 10, connects to the apparatus 50 for controlling the execution of mashup WoT service at step S10.

Furthermore, the user who desires to receive a mashup WoT service inquires about and selects a desired mashup WoT service at step S12. In this case, various types of information (for example, age, gender, heart rate, location, etc.) about the user who desires to receive a mashup WoT service, a selection condition, and information about the surroundings of the user (for example, temperature, humidity, air current speed, radiant temperature, water vapor partial pressure, etc.), etc. are transmitted to the apparatus 50 for controlling the execution of mashup WoT service.

Accordingly, the WoT mashup engine 52b selects a mashup WoT service most optimum for the user based on the current location of the user, the time at which the user made an execution request, mashup conditions (for example, preference, etc.), and order of priority (for example, the order in which mashup WoT services having the same priority can be sequentially selected) at step S14. That is, the WoT mashup engine 52b may select the most optimum mashup WoT service, which can realize the mashup WoT service selected by the user, from the WoT service repository 56. In other words, WoT service execution descriptions each descriptive of execution logic for each simple WoT service are stored in the WoT service repository 56. Therefore, when WoT service execution descriptions most optimum for the user are selected and then combined, a mashup WoT service most optimum for the user may be selected. In this case, the mashup WoT service selected by the WoT mashup engine 52b may be viewed as a combination of two or more simple WoT services. In this case, the two or more simple WoT services are services that can most precisely, reliably and effectively realize a mashup WoT service selected by the user. In the following, a selected mashup WoT service is assumed to be a combination of two or more simple WoT services. Furthermore, the execution rule of the selected mashup WoT service corresponds to one of sequential execution, arithmetic operation execution, logic operation execution, and conditional execution.

Thereafter, the WoT mashup engine 52b checks the service rule of the mashup WoT service (that is, the selected mashup WoT service most optimum for the user) that should be executed at the WoT service repository 56.

If, as a result of the checking, it is determined that the service rule corresponds to sequential execution, the WoT mashup engine 52b performs the sequential execution in conjunction with the WoT service execution functional entity 54 based on the selected simple WoT services at steps S16 and S18. For example, if the service rule of the corresponding mashup WoT service is "#C=#B (#A)," the WoT service execution functional entity 54 executes simple WoT service #A, and the WoT mashup engine 52b executes simple WoT service #B using the result of the WoT service execution functional entity 54 as the input of the simple WoT service #B.

Thereafter, the WoT mashup engine 52b considers the result of the execution to be the result of the corresponding mashup WoT service #C at step S20.

Furthermore, the WoT mashup engine 52b registers the corresponding mashup WoT service as a new simple WoT service at step S22. That is, the WoT mashup engine 52b considers the mashup WoT service, the result value of which has been obtained at step S20, to be a new simple WoT service, and stores the new simple WoT service in the WoT service repository 56 in order to use it in the future. Furthermore, the WoT mashup engine 52b provides the result of the execution of the corresponding mashup WoT service to the user (i.e., the WoT service user 10).

If needed, step S22 of registering the corresponding mashup WoT service as a new simple WoT service may be omitted. That is, if the result of the corresponding mashup WoT service is calculated at step S20, the result may be provided directly to the corresponding WoT service user 10.

Meanwhile, if, as a result of the checking, it is determined that the service rule corresponds to arithmetic operation execution, the WoT mashup engine 52b performs the arithmetic operation execution in conjunction with the WoT service execution functional entity 54 based on the selected simple WoT services at steps S24 and S26. For example, if the service rule of the corresponding mashup WoT service is "#C=α·#A+β·#B," WoT service execution functional entity 54 separately executes simple WoT services #A and #B. Thereafter, the WoT mashup engine 52b obtains the result of mashup WoT service #C based on the results of the operation of the executed simple WoT services #A and #B. That is, the WoT mashup engine 52b applies parameter α to the simple WoT service #A and parameter β to the simple WoT service #B, and then calculates the sum of the results of the application as the result of the mashup WoT service #C. Thereafter, the WoT mashup engine 52b performs the operations of the above-described steps S20 and S22.

Meanwhile, if, as a result of the checking, it is determined that the service rule corresponds to logic operation execution, the WoT mashup engine 52b performs the logic operation execution in conjunction with the WoT service execution functional entity 54 based on the selected simple WoT services at steps S28 and S30. For example, if the service rule of the corresponding mashup WoT service is "#C=#A & #B," the WoT service execution functional entity 54 executes simple WoT services #A and #B. Thereafter, the WoT mashup engine 52b calculates the result of #C based on the results of the execution of the simple WoT services #A and #B. Thereafter, the WoT mashup engine 52b performs the operations of the above-described steps S20 and S22.

Meanwhile, if, as a result of the checking, it is determined that the service rule corresponds to conditional execution, the WoT mashup engine 52b performs the logic operation execution in conjunction with the WoT service execution functional entity 54 based on the selected simple WoT services at steps S32 and S34. For example, if the service rule of the corresponding mashup WoT service is "#A ? #B:#C," the WoT mashup engine 52b executes simple WoT service #B when simple WoT service #A meets a specific condition, and perform simple WoT service #C when the simple WoT service #A does not meet a specific condition. In other words, the WoT mashup engine 52*b* executes the simple WoT service #B when the result of the operation of the simple WoT service #A executed by the WoT service execution functional entity 54 meets a specific condition, and executes the simple WoT service #C when the result of the operation of the simple WoT service #A does not meet the specific condition.

Meanwhile, in the foregoing description, the creation of mashup service logic, making an inquiry about a mashup service, and the deletion and modification of a mashup service have not been described separately. However, such creation, making an inquiry, deletion and modification can be sufficiently performed by the WoT service user 10 and the WoT mashup logic management 52*a*.

For example, when the WoT service user 10 requests the creation of desired mashup service logic, the WoT mashup logic management 52*a* generates the corresponding mashup service logic, and stores the generated mashup service logic in the WoT service repository 56. That is, it is considered that a new WoT service execution description is generated and stored in the WoT service repository 56. In this case, the newly generated mashup service logic is adopted and used in response to the selection of the mashup WoT service by the WoT service user 10 in the future.

When the WoT service user 10 requests an inquiry about a desired mashup service, the WoT mashup logic management 52*a* searches for the corresponding mashup service in the WoT service repository 56, and then transmits the retrieved mashup service to the WoT service user 10.

When the WoT service user 10 requests the deletion of a desired mashup service, the WoT mashup logic management 52*a* searches for the corresponding mashup service in the WoT service repository 56, and then deletes the retrieved mashup service.

When the WoT service user 10 requests the modification (update) of a desired mashup service, the WoT mashup logic management 52*a* searches for the corresponding mashup service in the WoT service repository 56, and modifies (updates) the retrieved mashup service.

Figure 8:
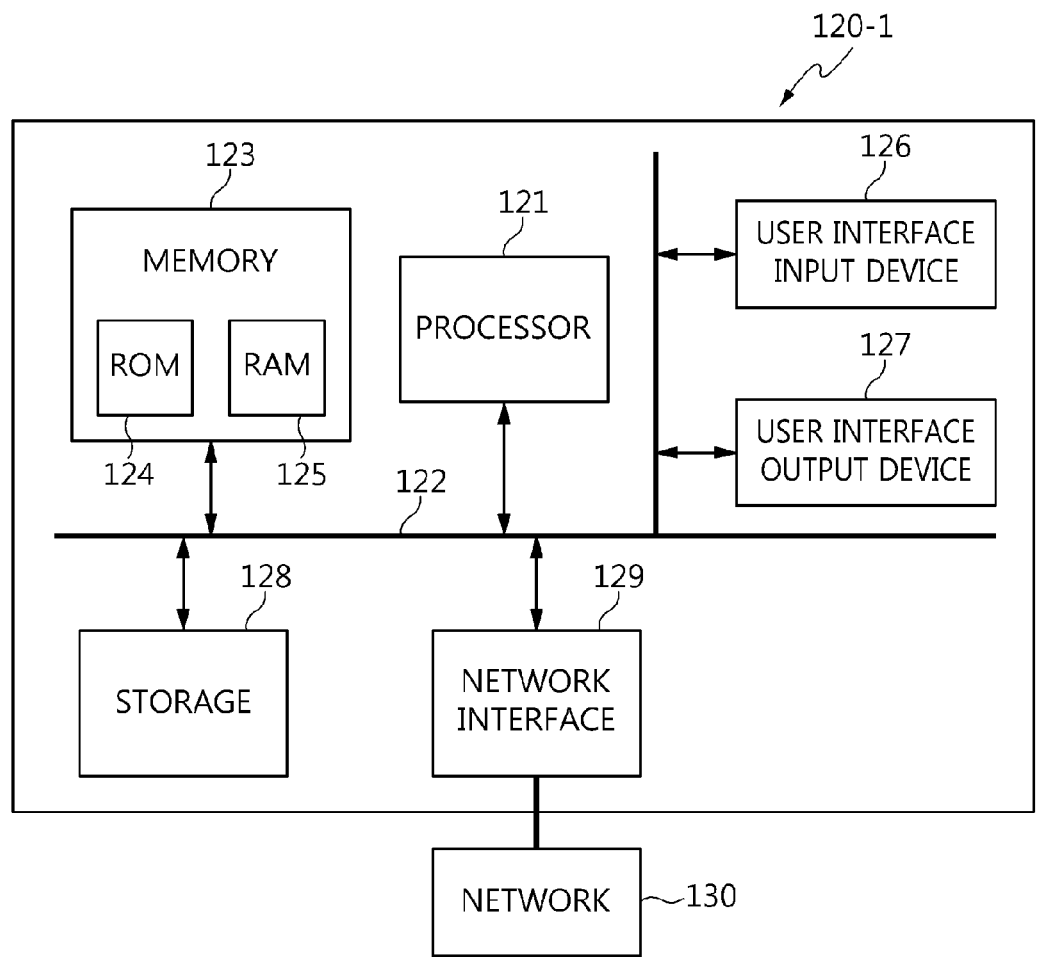
FIG. 8 is an embodiment of the present invention implemented in a computer system.

FIG. 8 is an embodiment of the present invention implemented in a computer system.

Referring to FIG. 8, an embodiment of the present invention may be implemented in a computer system, e.g., as a computer readable medium. As shown in in FIG. 8, a computer system 120-1 may include one or more of a processor 121, a memory 123, a user input device 126, a user output device 127, and a storage 128, each of which communicates through a bus 122. The computer system 120-1 may also include a network interface 129 that is coupled to a network 130. The processor 121 may be a central processing unit (CPU) or a semiconductor device that executes processing instructions stored in the memory 123 and/or the storage 128. The memory 123 and the storage 128 may include various forms of volatile or non-volatile storage media. For example, the memory may include a read-only memory (ROM) 124 and a random access memory (RAM) 125.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

According to the present invention configured as described above, a WoT service mashup can be registered and executed so that an optimum WoT service appropriate for the requirements of each user can be received.

A mashup service in which most appropriate WoT services are combined is executed based on the time at which a user makes an execution request, the location of the user, mashup conditions and order of priority with respect to a single mashup WoT service, and the result of the execution may be provided to a user. For example, in the case of WoT service mashup for weather inquiry, when a user requires high precision, a WoT service that provides a highly precise temperature measurement value can be executed based on temperature WoT services adjacent to the current location of a user. Furthermore, the result of the service can be provided to the user.

As described above, the optimum embodiments have been disclosed in the drawings and the specification. Although specific terms have been used herein, they have been used merely for the purpose of describing the present invention, but have not been used to restrict their meanings or limit the scope of the present invention set forth in the claims. Accordingly, it will be understood by those having ordinary knowledge in the relevant technical field that various modifications and other equivalent embodiments can be made. Therefore, the true range of protection of the present invention should be defined based on the technical spirit of the attached claims.

What is claimed is:

1. An apparatus for controlling execution of mashup WoT service, comprising:
  a Web of things (WoT) mashup service functionality entity configured to execute a mashup WoT service for a WoT service user;
  a WoT service execution functional entity configured to execute simple WoT services in order to execute the mashup WoT service of the WoT mashup service functionality entity; and
  a WoT service repository configured to store WoT service execution descriptions describing execution logic for each of the simple WoT services,
  wherein the WoT mashup service functionality entity executes the mashup WoT service in accordance with the WoT service execution descriptions read from the WoT service repository.

2. The apparatus of claim 1, wherein the WoT mashup service functionality entity comprises:
  a WoT mashup logic management configured to inquire of the WoT service repository about the WoT service execution descriptions or to register or to update the WoT service execution descriptions.

3. The apparatus of claim 1, wherein the WoT service execution functional entity operates in conjunction with a WoT broker or a general Web service in order to execute each of the simple WoT services.

4. The apparatus of claim 1, wherein each of the WoT service execution descriptions stipulates a method of executing the simple WoT service or a method of executing the mashup WoT service in which two or more simple WoT services are combined.

5. The apparatus of claim 1, wherein each of the WoT service execution descriptions comprises information about the mashup WoT service, a service rule adapted to execute the mashup WoT service generated by combining the two or more simple WoT services, and service profiles representative of parameters adapted to identify the mashup WoT service for the WoT service user.

6. The apparatus of claim 5, wherein the service rule corresponds to any one of sequential execution, arithmetic operation execution, logic operation execution, and conditional execution.

* * * * *